US012563189B2

(12) United States Patent (10) Patent No.: US 12,563,189 B2
Guan et al. (45) Date of Patent: Feb. 24, 2026

(54) VIDEO COMPRESSION METHOD AND APPARATUS, VIDEO DECOMPRESSION METHOD AND APPARATUS, COMPUTER DEVICE, AND STORAGE MEDIUM

(71) Applicant: Tencent Technology (Shenzhen) Company Limited, Shenzhen (CN)

(72) Inventors: Yonghang Guan, Shenzhen (CN); Kuan Tian, Shenzhen (CN); Jinxi Xiang, Shenzhen (CN); Jun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 22 days.

(21) Appl. No.: 18/816,556

(22) Filed: Aug. 27, 2024

(65) Prior Publication Data

US 2025/0080727 A1 Mar. 6, 2025

Related U.S. Application Data

(63) Continuation of application No. PCT/CN2023/124015, filed on Oct. 11, 2023.

(30) Foreign Application Priority Data

Nov. 18, 2022 (CN) .......................... 202211446352.0

(51) Int. Cl.
   *H04N 19/11* (2014.01)
   *G06V 10/77* (2022.01)
   (Continued)

(52) U.S. Cl.
   CPC ......... *H04N 19/11* (2014.11); *G06V 10/7715* (2022.01); *G06V 20/46* (2022.01); *H04N 19/136* (2014.11); *H04N 19/172* (2014.11)

(58) Field of Classification Search
   CPC .... H04N 19/11; H04N 19/136; H04N 19/172; G06V 10/7715; G06V 20/46
   See application file for complete search history.

(56) References Cited

U.S. PATENT DOCUMENTS 6,590,573 B1 * 7/2003 Geshwind .............. H04N 7/122
                                                    348/E13.058
8,780,971 B1 * 7/2014 Bankoski ............. H04N 19/117
                                                    375/240

(Continued)

FOREIGN PATENT DOCUMENTS

CN      103533356 A     1/2014
CN      103974068 A     8/2014

(Continued)

OTHER PUBLICATIONS

Yang, Haitao translation of WO 2022184031 Feb. 28, 2022 (Year: 2022).*

(Continued)

*Primary Examiner* — Zaihan Jiang
(74) *Attorney, Agent, or Firm* — Crowell & Moring LLP

(57) ABSTRACT

This application relates to a video compression and video decompression that includes: generating, based on a key frame and a forward search frame of a video, a pixel kernel of each pixel in the key frame; performing smoothness constraint processing on the pixel kernel, to obtain a target pixel kernel; compressing the key frame and the target pixel kernel, to obtain a compressed key frame and a compressed pixel kernel; compressing a residual graph between the forward search frame and a predicted frame, to obtain a compressed graph, the predicted frame being a video frame generated based on the target pixel kernel and the key frame; and obtaining a compressed video packet according to the compressed graph, the compressed key frame, and the compressed pixel kernel.

20 Claims, 8 Drawing Sheets

(51) Int. Cl.
   *G06V 20/40*    (2022.01)
   *H04N 19/136*   (2014.01)
   *H04N 19/172*   (2014.01)

(56)          References Cited

U.S. PATENT DOCUMENTS

| | | | | |
|---|---|---|---|---|
| 8,929,719 B2 * | 1/2015 | Harris | .................... | G06Q 30/02 |
| | | | | 386/239 |
| 9,344,729 B1 * | 5/2016 | Grange | ................ | H04N 19/147 |
| 2002/0186890 A1 * | 12/2002 | Lee | ........................ | H04N 19/80 |
| | | | | 375/E7.193 |
| 2007/0206672 A1 | 9/2007 | Yamashita et al. | | |
| 2015/0116353 A1 * | 4/2015 | Miura | ................ | G02B 27/0075 |
| | | | | 345/632 |
| 2016/0189381 A1 * | 6/2016 | Rhoads | ..................... | G06T 7/33 |
| | | | | 382/103 |
| 2016/0295243 A1 * | 10/2016 | Ashrafi | ................ | H04N 19/186 |
| 2017/0244962 A1 * | 8/2017 | Roskowski | ............ | H04N 7/188 |
| 2018/0103243 A1 * | 4/2018 | Lee | ........................ | G06V 10/44 |
| 2020/0077065 A1 * | 3/2020 | Schroers | .................. | H04N 9/43 |
| 2020/0081431 A1 * | 3/2020 | Weiss | ................... | H04N 21/234 |
| 2023/0326208 A1 * | 10/2023 | Cooley-White | ...... | G06F 16/783 |
| | | | | 382/103 |

FOREIGN PATENT DOCUMENTS

| | | | |
|---|---|---|---|
| CN | 113989633 | * | 9/2021 |
| CN | 115499666 A | | 12/2022 |
| WO | WO 2022184031 | * | 2/2022 |

OTHER PUBLICATIONS

Ding, Yi translation of CN 113989633 Sep. 16, 2021 (Year: 2021).*
International Search Report and Written Opinion for International
Application No. PCT/CN2023/124015 dated Feb. 6, 2024 including
English Translations (12 pages).

* cited by examiner

104

Data storage system ⟷ Store a video packet ⟷ Server

Video packet

Video packet

Obtain a compressed video packet according to the compressed graph, the compressed key frame, and the compressed pixel kernel Compress a residual graph between the forward search frame and a predicted frame, to obtain a compressed graph Compress the key frame and the target pixel kernel, to obtain a compressed key frame and a compressed pixel kernel Perform smoothness constraint processing on the pixel kernel, to obtain a target pixel kernel Generate, based on a key frame and a forward search frame of a video, a pixel kernel of each pixel in the key frame Communication network Video packet Video packet

102

106

Video packet

Decompress the compressed key frame and the compressed graph in the video packet, to obtain the key frame and the residual graph Decompress the compressed pixel kernel in the video packet, to obtain the target pixel kernel of each pixel in the key frame Perform inter-frame offset processing on a pixel and a neighborhood pixel of the pixel in the key frame in sequence based on the target pixel kernel, to obtain a predicted frame Perform image compensation on the predicted frame based on the residual graph, to obtain a target predicted frame, the key frame and the target predicted frame being video frames in the video Play the video

FIG. 1

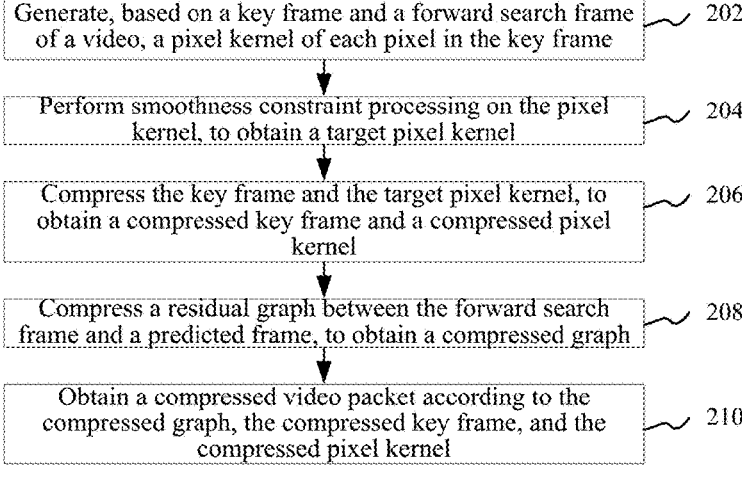

Generate, based on a key frame and a forward search frame of a video, a pixel kernel of each pixel in the key frame — 202

Perform smoothness constraint processing on the pixel kernel, to obtain a target pixel kernel — 204

Compress the key frame and the target pixel kernel, to obtain a compressed key frame and a compressed pixel kernel — 206

Compress a residual graph between the forward search frame and a predicted frame, to obtain a compressed graph — 208

Obtain a compressed video packet according to the compressed graph, the compressed key frame, and the compressed pixel kernel — 210

FIG. 2

Module provided in
this application
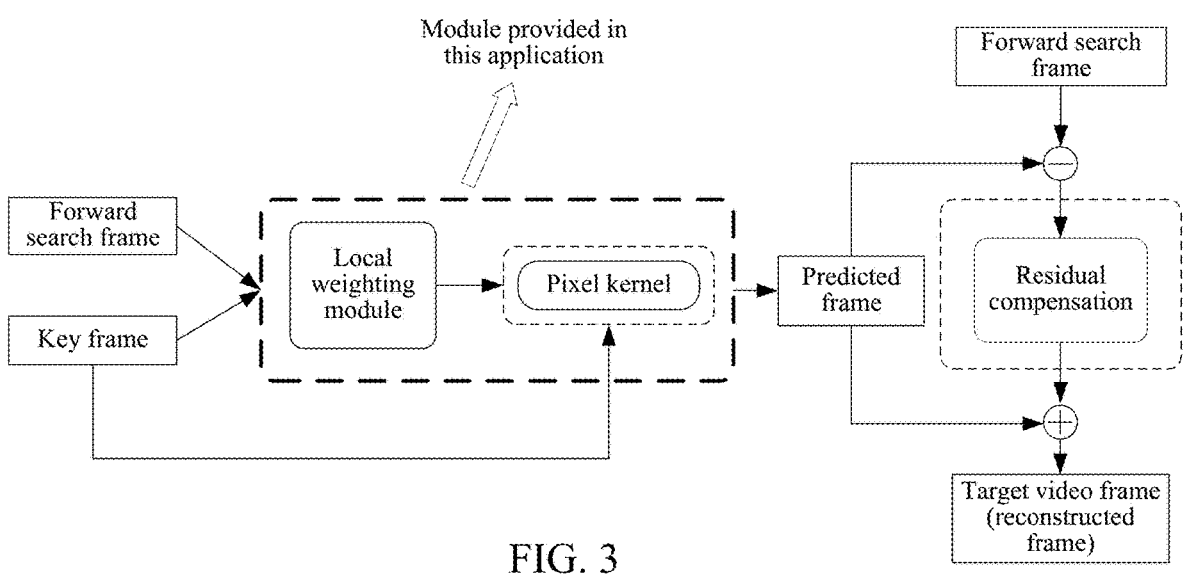
FIG. 3
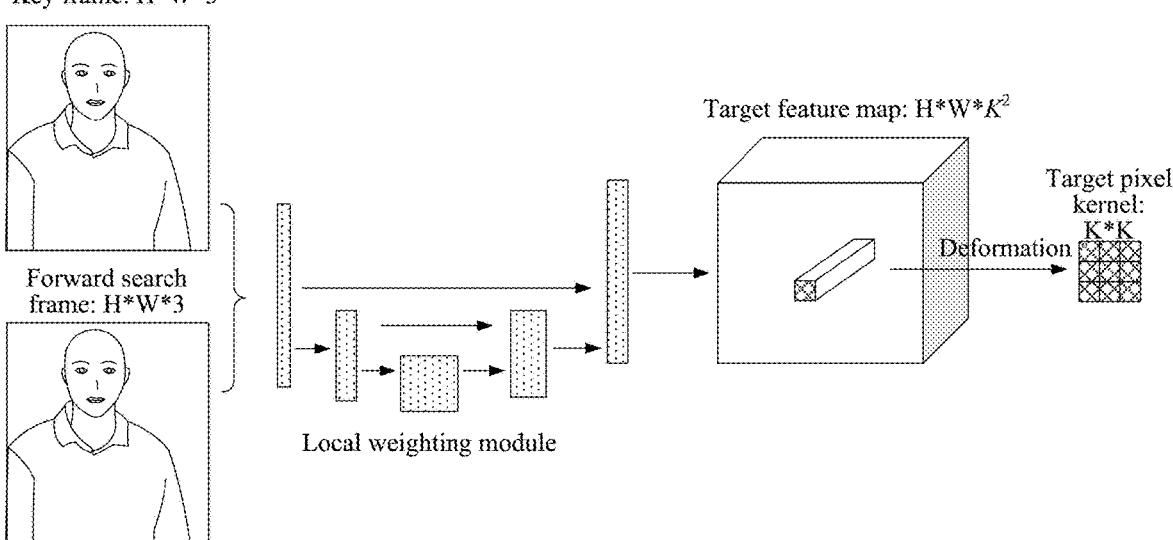
FIG. 4
| No smoothness | Smoothness constraint: first order | Smoothness constraint: second order | Smoothness constraint: first order+second order |
|---|---|---|---|
| | | | |
FIG. 5

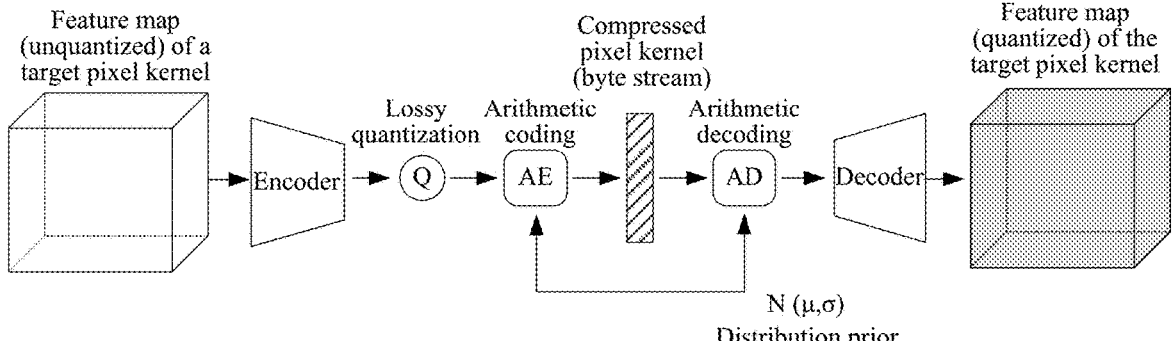
FIG. 6
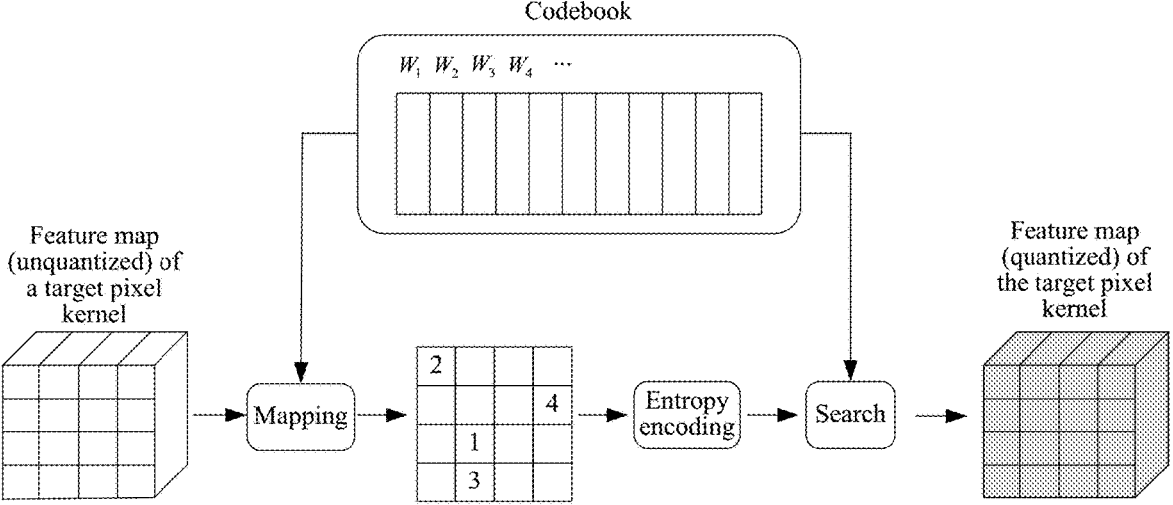
FIG. 7
| No smoothness | Weight: 0.1 | Weight: 10 | Weight: 100 | Weight: 1000 |
|---|---|---|---|---|
FIG. 8

902
Extract a key frame and a forward search frame from a video

904
Perform image feature extraction on the key frame and the forward search frame, to obtain a target feature map 906
Respectively convert feature vectors in the target feature map into pixels kernel of pixels in the key frame 1 64 64

572*572
570*570
568*568

128 64 64 2

392*392
390*390
388*388
388*388

128 128

284*284
282*282
280*280

256 128

200*200
198*198
196*196

256 256

140*140
138*138
136*136

512 256

104*104
102*102
100*100

512 512

284*284
282*282
280*280

1024 512

56*56
54*54
52*52

1024

68*68
66*66
64*64

➡ Convolution 3*3
⇨ Copy and crop
⇩ Down sampling 2*2
⇧ Up sampling 2*2
⇨ Convolution 1*1

~ 1102

Decompress a compressed key frame and a compressed graph in a video packet, to obtain a key frame and a residual graph

~ 1104

Decompress a compressed pixel kernel in the video packet, to obtain a target pixel kernel

~ 1106

Perform inter-frame offset processing on a pixel and a neighborhood pixel of the pixel in the key frame in sequence based on the target pixel kernel, to obtain a predicted frame

~ 1108

Perform image compensation on the predicted frame based on the residual graph, to obtain a target predicted frame, the key frame and the target predicted frame being video frames in the video

FIG. 11

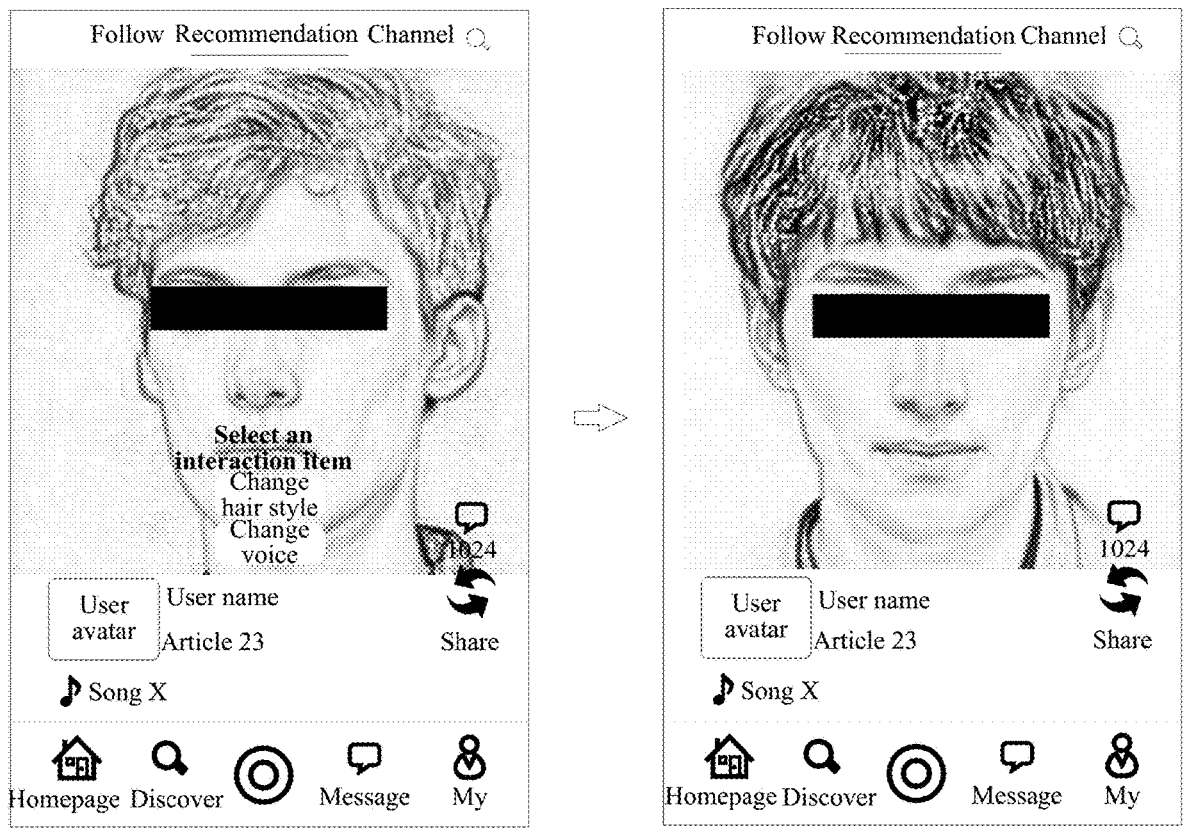

FIG. 12

| Moving direction | Previous frame | Current frame | Predicted frame | Reconstructed frame | Visualization 1 of a pixel kernel | Visualization 2 of the pixel kernel |
|---|---|---|---|---|---|---|
| Upper left | | | | | | |
| Upper right | | | | | | |

VIDEO COMPRESSION METHOD AND APPARATUS, VIDEO DECOMPRESSION METHOD AND APPARATUS, COMPUTER DEVICE, AND STORAGE MEDIUM

RELATED APPLICATION

This application claims is a continuation of International Patent Application No. PCT/CN2023/124015, filed Oct. 11, 2023, which claims priority to Chinese Patent Application No. 2022114463520, entitled "VIDEO COMPRESSION METHOD AND APPARATUS, VIDEO DECOMPRESSION METHOD AND APPARATUS, COMPUTER DEVICE, AND STORAGE MEDIUM" filed on Nov. 18, 2022. The contents of International Patent Application No. PCT/CN2023/124015 and Chinese Patent Application No. 2022114463520 are each incorporated herein by reference in their entirety.

FIELD OF THE TECHNOLOGY

This application relates to the field of video processing technologies, and in particular, to a video compression method and apparatus, a video decompression method and apparatus, a computer device, and a storage medium

BACKGROUND OF THE DISCLOSURE

With the development of mobile Internet, video data occupies most of network traffic, and requirements of people for various video forms (for example, live streaming and on-demand) are increasing. However, the ultra-large file size of original video data poses huge difficulty for video storage and transmission.

Currently, a common artificial intelligence video compression algorithm mainly aims at forward search frame compression. To be specific, during motion estimation, an optical flow field between frames is estimated by using an optical flow network, and the optical flow field is applied to the previous frame as a prediction offset, to obtain a predicted frame. However, the optical flow network can only be used for pixel-level offset prediction, cannot accurately estimate an offset in the case of complex motion deformation. The inaccurate offset estimation results in additional residual compensation information.

SUMMARY

Various embodiments of this application provide a video compression method and apparatus, a video decompression method and apparatus, a computer device, and a storage medium.

According to a first aspect, this application provides a video compression method, performed by a computer device, the method including:

generating, based on a key frame and a forward search frame of a video, a pixel kernel of each pixel in the key frame;

performing smoothness constraint processing on the pixel kernel, to obtain a target pixel kernel;

compressing the key frame and the target pixel kernel, to obtain a compressed key frame and a compressed pixel kernel;

compressing a residual graph between the forward search frame and a predicted frame, to obtain a compressed graph, the predicted frame being a video frame generated based on the target pixel kernel and the key frame; and obtaining a compressed video packet according to the compressed graph, the compressed key frame, and the compressed pixel kernel.

According to a second aspect, this application further provides a video compression apparatus, the apparatus including:

a first generation module, configured to generate, based on a key frame and a forward search frame of a video, a pixel kernel of each pixel in the key frame;

a constraint processing module, configured to perform smoothness constraint processing on the pixel kernel, to obtain a target pixel kernel;

a first compression module, configured to compress the key frame and the target pixel kernel, to obtain a compressed key frame and a compressed pixel kernel;

a second compression module, configured to compress a residual graph between the forward search frame and a predicted frame, to obtain a compressed graph, the predicted frame being a video frame generated based on the target pixel kernel and the key frame; and a second generation module, configured to obtain a compressed video packet according to the compressed graph, the compressed key frame, and the compressed pixel kernel.

According to a third aspect, this application further provides a computer device. The computer device includes a memory and a processor, the memory stores a computer program, and when executing the computer program, the processor implements the operations of the video compression method.

According to a fourth aspect, this application further provides a computer-readable storage medium. The computer-readable storage medium has a computer program stored therein, and when being executed by a processor, the computer program implements the operations of the video compression method.

According to a fifth aspect, this application further provides a computer program product. The computer program product includes a computer program, and when being executed by a processor, the computer program implements the operations of the video compression method.

According to a sixth aspect, this application provides a video decompression method, performed by a computer device, the method including:

decompressing a compressed key frame and a compressed graph in a video packet, to obtain a key frame and a residual graph;

decompressing a compressed pixel kernel in the video packet, to obtain a target pixel kernel of each pixel in the key frame;

performing inter-frame offset processing on a pixel and a neighborhood pixel of the pixel in the key frame in sequence based on the target pixel kernel, to obtain a predicted frame; and performing image compensation on the predicted frame based on the residual graph, to obtain a target predicted frame, the key frame and the target predicted frame being video frames in a video.

According to a seventh aspect, this application further provides a video decompression apparatus, the apparatus including:

a first decompression module, configured to decompress a compressed key frame and a compressed graph in a video packet, to obtain a key frame and a residual graph;

a second decompression module, configured to decompress a compressed pixel kernel in the video packet, to obtain a target pixel kernel of each pixel in the key frame;

an offset processing module, configured to perform interframe offset processing on a pixel and a neighborhood pixel of the pixel in the key frame in sequence based on the target pixel kernel, to obtain a predicted frame; and a compensation module, configured to perform image compensation on the predicted frame based on the residual graph, to obtain a target predicted frame, the key frame and the target predicted frame being video frames in a video.

According to an eighth aspect, this application further provides a computer device. The computer device includes a memory and a processor, the memory stores a computer program, and when executing the computer program, the processor implements the operations of the video decompression method.

According to a ninth aspect, this application further provides a computer-readable storage medium. The computer-readable storage medium has a computer program stored therein, and when being executed by a processor, the computer program implements the operations of the video decompression method.

According to a tenth aspect, this application further provides a computer program product. The computer program product includes a computer program, and when being executed by a processor, the computer program implements the operations of the video decompression method.

Details of one or more embodiments of this application are provided in the subsequent accompanying drawings and descriptions. Other features and advantages of this application become clear with reference to the specification, the accompanying drawings, and the claims.

BRIEF DESCRIPTION OF DRAWINGS

FIG. 1 is a diagram of an application environment of a video compression method and a video decompression method according to an embodiment.

FIG. 2 is a schematic flowchart of a video compression method according to an embodiment.

FIG. 3 is a schematic diagram of a system structure of a video compression method and a video decompression method according to an embodiment.

FIG. 4 is a schematic diagram of generating a target pixel kernel based on a local weighting module according to an embodiment.

FIG. 5 is a schematic diagram of comparison between pixel kernels of different orders according to an embodiment.

FIG. 6 is a schematic diagram of compressing and decompressing a feature map of a target pixel kernel according to an embodiment.

FIG. 7 is a schematic diagram of compressing and decompressing a feature map of a target pixel kernel according to another embodiment.

FIG. 8 is a schematic diagram of impact of different weights on distribution of target pixel kernels according to an embodiment.

FIG. 11 is a schematic flowchart of a video decompression method according to an embodiment.

FIG. 12 is a schematic diagram of jumping to a corresponding progress for playback according to a triggered interaction control when a video is played after decompression according to an embodiment.

DESCRIPTION OF EMBODIMENTS

Figures 9, 10:
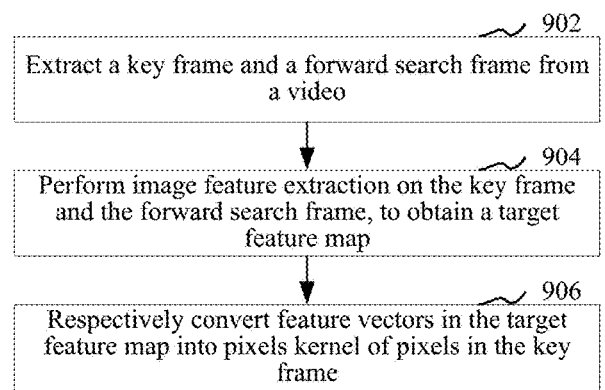
FIG. 9 is a schematic flowchart of extracting a target feature map according to an embodiment.
FIG. 10 is a schematic diagram of a structure model based on a local weighting module according to an embodiment.

To make objectives, technical solutions, and advantages of this application clearer and more comprehensible, this application is further elaborated in detail with reference to accompanying drawings and embodiments. The specific embodiments described herein are only used for explaining this application, and are not configured for limiting this application.

A video compression method and a video decompression method provided in the embodiments of this application may be applied to an application environment shown in FIG. 1. A terminal 102, a server 104, and a terminal 106 may communicate with each other through a network. A data storage system may store data that needs to be processed by the server 104. The data storage system may be integrated on the server 104 or may be placed on a cloud or another network server.

Although FIG. 1 shows that the terminal 102 performs the video compression method and the terminal 106 performs the video decompression method, during actual application, both the video compression method and the video decompression method may be applied to the terminal 102, the server 104, or the terminal 106 in FIG. 1, that is, any one of the terminal 102, the server 104, and the terminal 106 may compress and decompress a video by using the compression method and the decompression method in this application.

When the terminal 102 performs the video compression method, the terminal 102 may store an obtained video packet locally, may upload the obtained video packet to the server 104 for the terminal 106 to demand, or may send the obtained video packet to the terminal 106 through a live streaming platform. In this case, the terminal 106 may perform the decompression method to decompress the received video packet. Similarly, when the terminal 106 performs the video compression method, reference may be made to the foregoing manner.

When the server 104 performs the video compression method, the server 104 may store an obtained video packet locally. When the terminal 102 or the terminal 106 needs to perform video on demand, the server 104 sends the video packet to the terminal 102 or the terminal 106 through a data stream, so that the terminal 102 or the terminal 106 performs the decompression method to decompress the received video packet.

When a video is compressed, to avoid a problem that an offset predicted by using an optical flow network is inaccurate in a conventional solution, in this application, a pixel kernel of each pixel in a key frame is generated by using the key frame and a forward search frame of the video, and smoothness constraint processing is performed on the pixel kernel, to obtain a target pixel kernel representing inter-frame motion. Because the target pixel kernel aims at each pixel in the key frame, weighted processing is performed on a pixel and a neighborhood pixel of the pixel in the key frame by using the target pixel kernel, so that the inter-frame motion is modeled, thereby effectively improving accuracy of estimation of the inter-frame motion, and additional residual compensation is not needed when compression is performed.

The terminal 102 and the terminal 106 may be smartphones, tablet computers, notebook computers, desktop computers, smart speakers, smart watches, Internet of Things devices, or portable wearable device. The Internet of Things device may be a smart speaker, a smart television, a smart air conditioner, a smart vehicle-mounted device, or the like. The smart wearable device may be a smart watch, a smart band, a head-mounted device, or the like.

The server 104 may be an independent physical server or may be a serving node in a blockchain system. A peer to peer (P2P) network is formed between serving nodes in the blockchain system. A P2P protocol is an application-layer protocol running over a transmission control protocol (TCP). The server 104 may be a server cluster formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

The terminal 102 and the terminal 106 may be connected to the server 104 in a communication connection manner such as a Bluetooth, a universal serial bus (USB), or a communication network. This is not limited in this application.

In an embodiment, as shown in FIG. 2, a video compression method is provided. The method may be applied to the terminal 102, the server 104, or the terminal 106 in FIG. 1. An example in which the method is applied to the terminal 102 in FIG. 1 is configured for description, and the method includes the following operations.

S202: Generate, based on a key frame and a forward search frame of a video, a pixel kernel of each pixel in the key frame.

The video may be a video of any type produced by a production object, for example, a short video, a long video, or a live streaming video. After being compressed by using the compression method in this application, the short video and the long video may be stored in a content delivery network for on-demand when needed. After being compressed by using the compression method in this application, the live streaming video may be transmitted to an object watching live streaming. When the video is the live streaming video, the video may be compressed in a segmentation manner, that is, each time a segment of video is obtained, the obtained segment of video may be compressed by using the compression method in this application. When the video is the short video or the long video for on-demand or being stored locally, the entire video may be compressed by using the compression method in this application.

The key frame may be a video frame on which intra-frame encoding needs to be performed in the video. For example, a video has a plurality of shots (namely, a clip between every two edit points in the video), and a first frame of each shot may be used as the key frame. For another example, when a difference between two adjacent video frames reaches a preset threshold, the latter video frame may alternatively be used as the key frame. The key frame may be a red green blue (RGB) three-channel image or may be an image of another type.

The forward search frame may be a video frame other than the key frame in the video and may be reconstructed by using the key frame and inter-frame difference information (for example, a residual graph and a target pixel kernel in this application). The forward search frame may be a three-channel image or may be an image of another type. A relationship between the key frame and the forward search frame of the video may be learned by using the following example: it is assumed that a first frame, a fourth frame, and a seventh frame of a video A are key frames, other video frames such as a second frame, a third frame, a fifth frame, a sixth frame, an eighth frame, a ninth frame, and a tenth frame in the video A are forward search frames. The terminal may reconstruct the second frame and the third frame by using the first frame and corresponding inter-frame difference information, reconstruct the fifth frame and the sixth frame by using the fourth frame and corresponding inter-frame difference information, and reconstruct the eighth frame, the ninth frame, and the tenth frame by using the seventh frame and corresponding inter-frame difference information.

The pixel kernel may be a matrix including inter-frame spatial motion information. After smoothness constraint processing is performed on the pixel kernel, the pixel kernel can learn fuzzy information and accurate inter-frame spatial motion (namely, spatial motion of an object between different frames, or spatial motion of a photographing device at different photographing moments), and it is ensured that structures of pixel kernels of adjacent pixels are similar. When a quantity of forward search frames corresponding to a key frame is 1, a quantity of pixel kernels of each pixel in the key frame is 1 or 1*k, k being a positive integer greater than 1. Therefore, one pixel kernel or 1*k pixel kernels acts or act on a corresponding pixel and a neighborhood pixel of the pixel in the key frame, and a corresponding pixel in the forward search frame and a value of the pixel may be predicted. When a quantity of forward search frames corresponding to a key frame is n (n≥2), a quantity of pixel kernels of each pixel in the key frame is n or n*k. Therefore, n or n*k pixel kernels sequentially act on corresponding pixels and neighborhood pixels of the pixels in the key frame, and corresponding pixels in the n forward search frames and values of the pixels may be predicted. The spatial motion may also be referred to as inter-frame motion and a spatial offset.

In an embodiment, the terminal may input the key frame and the forward search frame of the video into a local weighting module, and the local weighting module may generate the pixel kernel corresponding to each pixel in the key frame according to the forward search frame and the key frame, as shown in FIG. 3.

The local weighting module may be mainly formed by a feature extraction network. A network structure of the feature extraction network may be an auto-encoder structure and may include an encoder part and a decoder part. An encoder in the encoder part and a decoder in the decoder part are in a skip connection. For details, reference may be made to a local weighting module shown in FIG. 4. The local weighting module is a module provided in this application, and may adaptively construct both inter-frame space and scale information and has good granularity.

S204: Perform smoothness constraint processing on the pixel kernel, to obtain a target pixel kernel.

To constrain a pixel kernel from meeting a smooth and continuous prior and make it easier to information compression and storage, in this application, a smoothness constraint regularization term is constructed. Therefore, smoothness constraint processing may be performed on the pixel kernel based on the smoothness constraint regularization term. The smoothness constraint regularization term may include an intra-kernel smoothness constraint regularization term and an inter-kernel smoothness constraint regularization term.

The smoothness constraint regularization term is implemented by constraining an L2 norm of a gradient (for example, at least one of a first-order gradient, a second-order gradient, or another-order gradient) of a pixel kernel. For example, a feature map of a pixel kernel is set to Kernels, and a size of the feature map is (K*K*H*W), where K*K represents a size of the pixel kernel, and H*W represents a spatial size (namely, an image size) of a key frame and a forward search frame. Therefore, formulas for calculating the intra-kernel smoothness constraint regularization term and the inter-kernel smoothness constraint regularization term are as follows:

$$\text{smooth}_{intra} = \text{mean}(\|\text{Kernels}[1:,:,:,:] - \text{Kernels}[:K-1,:,:,:]\|_2 +$$
$$\|\text{Kernels}[:,1:,:,:] - \text{Kernels}[:,:K-1,:,:]\|_2)$$
$$\text{smooth}_{inter} = \text{mean}(\|\text{Kernels}[:,:,1:,:] - \text{Kernels}[:,:,:H-1,:]\|_2 +$$
$$\|\text{Kernels}[:,:,:,1:] - \text{Kernels}[:,:,:,:W-1]\|_2)$$

Therefore, the smoothness constraint processing may include intra-kernel smoothness constraint processing and inter-kernel smoothness constraint processing, the intra-kernel smoothness constraint processing indicates smoothness constraint processing inside a pixel kernel, and the inter-kernel smoothness constraint processing indicates smoothness constraint processing between pixel kernels. Accurate inter-frame spatial motion can be learned by using the target pixel kernel obtained through the smoothness constraint processing (that is, inter-frame spatial motion can be accurately predicted by using the target pixel kernel), and fuzzy information is further learned. The target pixel kernel may be a matrix formed by weight values, and distribution of weight values that are not 0 in the target pixel kernel may be configured for spatial offset prediction. In addition, structures of target pixel kernels of adjacent pixels are similar, are more likely to meet a priori motion estimation (that is, motion information of adjacent areas is relatively similar), and facilitate information compression. The fuzzy information may be configured for modeling uncertainty of spatial offset prediction, so that residual compensation is easier, and an additional error caused by incorrect motion estimation does not need to be compensated.

In an embodiment, the terminal performs intra-kernel smoothness constraint processing on the pixel kernel of each pixel, to obtain a processed pixel kernel of each pixel; and performs inter-kernel smoothness constraint processing on the processed pixel kernel of each pixel, to obtain the target pixel kernel configured for representing inter-frame motion. Specifically, the terminal combines the pixel kernel of each pixel, to obtain a feature map of the pixel kernel; and then performs intra-kernel smoothness constraint processing on the feature map of the pixel kernel, and performs inter-kernel smoothness constraint processing. Specifically, the terminal may perform intra-kernel smoothness constraint processing on the pixel kernel of each pixel based on the intra-kernel smoothness constraint regularization term, to obtain the processed pixel kernel of each pixel; and performs inter-kernel smoothness constraint processing on the processed pixel kernel of each pixel based on the inter-kernel smoothness constraint regularization term, to obtain the target pixel kernel configured for representing inter-frame motion.

mean( ) in the formulas represents mean value calculation, and $\| \|_2$ represents the L2 norm. In square brackets, a first element represents a row element in the current pixel kernel, a second element represents a column element in the current pixel kernel, a third element represents a row element in another pixel kernel, and a fourth element represents each column of pixels in the another pixel kernel. In addition, 1: in the formula represents all weight values from a current weight value to a last weight value in the pixel kernel, :in the formula represents all weight values from a first weight value to the last weight value in the pixel kernel, :K−1 in the formula represents weight values from the first weight value to a $(K-1)^{th}$ weight value in the pixel kernel, :H−1 in the formula represents weight values from a first weight value to an $(H-1)^{th}$ weight value in the another pixel kernel, and :W−1 in the formula represents weight values from the first weight value to a $(W-1)^{th}$ weight value in the another pixel kernel.

In addition to the smoothness constraint processing manner, smoothness constraint processing may also be performed by using a filter. Alternatively, a mean value is calculated, and then weight values in the pixel kernel are processed by using the mean value, for example, a difference between the mean value and each weight value is calculated.

Smoothness constraint processing is performed in the foregoing manner, to obtain a first-order target pixel kernel. In addition, after the first-order target pixel kernel is obtained, smoothness constraint processing may be further performed on the first-order target pixel kernel in the foregoing manner again, to obtain a second-order target pixel kernel. After the second-order target pixel kernel is obtained, the first-order target pixel kernel and the second-order target pixel kernel may be further fused, to obtain a fused target pixel kernel. FIG. 5 is a diagram of a comparison between pixel kernels of different orders. During compression, the first-order target pixel kernel may be compressed, the second-order target pixel kernel may be compressed, or after the first-order target pixel kernel and the second-order target pixel kernel are fused, the target pixel kernel obtained through fusion is compressed. Different fuzzy information is learned by using the target pixel kernels of different orders.

During motion estimation based on a pixel kernel, inter-frame offset prediction may be affected by a size of the pixel kernel, and when an inter-frame offset exceeds the size of the pixel kernel, accuracy is reduced when motion prediction is performed by using the pixel kernel. Therefore, an excessively small size of the pixel kernel limits the offset prediction, and an excessively large size of the pixel kernel causes excessive occupation of a video RAM. Based on the foregoing case, this application provides a pixel kernel cascaded policy. Specifically, the terminal copies the target pixel kernel of each pixel in the key frame, so that each pixel corresponds to at least two target pixel kernels, and cascades target pixel kernels of a same pixel. Therefore, inter-frame offset prediction in a larger size is implemented on the premise that only small occupation of the video RAM is increased, thereby effectively improving accuracy of spatial motion prediction.

S206: Compress the key frame and the target pixel kernel, to obtain a compressed key frame and a compressed pixel kernel.

The compressed key frame may be a video frame obtained by performing intra-frame encoding (which belongs to a video compression technology) on the key frame, and the compressed key frame may be used as an intra-frame encoding frame (I frame).

In an embodiment, when compressing the key frame, the terminal may encode the key frame in an intra-frame encoding manner, to remove redundant information of image space in the key frame, to obtain the compressed key frame.

After being compressed, the video may be stored and transmitted. In addition, after being compressed, the target pixel kernel also needs to be stored and transmitted together with the video, so that when the video is decompressed, a corresponding video frame is reconstructed by using the target pixel kernel. To reduce space occupied by video storage or reduce a bandwidth occupied by video transmission, the target pixel kernel needs to be compressed, and the target pixel kernel may be compressed in the following two manners.

Compression manner 1: Directly compress the target pixel kernel.

In an embodiment, the terminal converts the target pixel kernel into a first latent variable; quantizes the first latent variable, to obtain a quantized first latent variable; and encodes the quantized first latent variable, to obtain the compressed pixel kernel.

The first latent variable may be a variable matching the target pixel kernel in latent space.

For example, the target pixel kernel of each pixel in the key frame is combined into a three-dimensional feature map, the feature map is inputted into an encoder, and the feature map is mapped to the latent space by using the encoder, to obtain the first latent variable. Then, lossy quantization and arithmetic coding are sequentially performed on the first latent variable, to obtain the compressed pixel kernel that is presented in a form of a byte stream and that is configured for storage and transmission, as shown in FIG. 6. During arithmetic coding, a probability of input data may be first estimated, and then the input data is encoded.

Compression manner 2: Compress the target pixel kernel by using a codebook.

In an embodiment, the terminal obtains a codebook; and maps the target pixel kernel to a word sequence based on the codebook, and encodes the word sequence, to obtain the compressed pixel kernel.

Several representative video frames are selected from a to-be-compressed video, and then the codebook may be constructed by using the selected video frames. Each word in the codebook corresponds to a target pixel kernel having a specific offset and fuzzy information.

For example, the target pixel kernel of each pixel in the key frame is combined into a three-dimensional feature map, then the feature map is mapped to words by using the codebook (that is, the feature map is represented by using sequence numbers of the words), and the pixel kernel may be compressed from a data amount $H*W*K*K$ to a data amount $H*W*1$ by using the codebook, thereby effectively reducing the data amount. Then, entropy encoding may be further performed on the words for further compression, as shown in FIG. 7. The codebook has been predefined at two ends of an encoder and a decoder, and does not need to be transmitted.

When at least two target pixel kernels are cascaded on a same pixel, the terminal may compress at least two target pixel kernels cascaded on each pixel in the key frame in any one of the foregoing compression manners to obtain the compressed pixel kernel.

S208: Compress a residual graph between the forward search frame and a predicted frame, to obtain a compressed graph, The predicted frame is a video frame generated based on the target pixel kernel and the key frame.

In an embodiment, the terminal may perform inter-frame offset processing on a pixel and a neighborhood pixel of the pixel in the key frame in sequence based on the target pixel kernel, to obtain a predicted frame. For example, for a key frame whose size is $H*W$, a target pixel kernel of a pixel in an $i^{th}$ row and a $j^{th}$ column in the key frame is $Kernels_{(i,j)}$, the pixel in the $i^{th}$ row and the $j^{th}$ column and a neighborhood pixel of the pixel in the key frame are $pixel_{(i,j)}$, and weighted processing is performed on $pixel_{(i,j)}$, that is, the pixel in the $i^{th}$ row and the $j^{th}$ column and the neighborhood pixel of the pixel in the key frame by using a weight value in $Kernels_{(i,j)}$, to obtain a predicted frame.

In an embodiment, the terminal determines the residual graph between the predicted frame and the forward search frame; converts the residual graph into a second latent variable; quantizes the second latent variable, to obtain a quantized second latent variable; and encodes the quantized second latent variable, to obtain the compressed graph.

The second latent variable may be a variable matching the residual graph in the latent space.

For example, the residual graph is inputted into an encoder, and the residual graph is mapped to the latent space by using the encoder, to obtain the second latent variable. Then, lossy quantization and arithmetic coding are sequentially performed on the second latent variable, to obtain the compressed graph that is presented in a form of a byte stream and that is configured for storage and transmission. For a compression process, reference may be made to FIG. 6.

S210: Obtain a compressed video packet according to the compressed graph, the compressed key frame, and the compressed pixel kernel.

The video packet may be a data packet of video content, and the data packet may be stored and transmitted in a network.

In an embodiment, the terminal may directly package the compressed graph, the compressed key frame, and the compressed pixel kernel, to obtain the compressed video packet. In addition, after obtaining the video packet, the terminal may further store or transmit the video packet, for example, store the video packet in a video library or transmit the video packet to a target end. The target end may be a terminal playing a video or a CDN server.

In an embodiment, after obtaining the video packet, the terminal may store the video packet. When the video packet needs to be decompressed, the compressed key frame and the compressed graph in the video packet are decompressed, to obtain the key frame and the residual graph. The compressed pixel kernel in the video packet is decompressed, to obtain the target pixel kernel. Inter-frame offset processing is performed on the pixel and the neighborhood pixel of the pixel in the key frame in sequence based on the target pixel kernel, for example, weighted processing is performed on the pixel and the neighborhood pixel of the pixel in the key frame in sequence based on a weight value in the target pixel kernel, to obtain the predicted frame. Image compensation is performed on the predicted frame based on the residual graph, to obtain a target predicted frame. The target predicted frame may also be referred to as a target video frame, and is a reconstructed video frame of the forward search frame.

If at least two copied target pixel kernels are compressed to obtain the compressed pixel kernel in the compression process, during decompression, the at least two target pixel kernels cascaded on each pixel in the key frame may be obtained. Then, inter-frame offset processing is performed on the pixel and the neighborhood pixel of the pixel in the key frame in sequence based on the at least two target pixel kernels cascaded on each pixel in the key frame, to obtain the predicted frame.

The decompressing the compressed graph may specifically include: The terminal decodes the compressed graph in the video packet, to obtain the quantized second latent variable; and converts the quantized second latent variable into the residual graph. For example, the compressed graph is inputted into a decoder, and the compressed graph is decoded by using the decoder, to obtain the quantized second latent variable. Then, the quantized second latent variable is converted into the quantized residual graph from the latent space. For a decompression process, reference may be made to FIG. 6.

The decompressing the compressed pixel kernel may specifically include: The terminal decodes the compressed pixel kernel in the video packet, to obtain the quantized first latent variable; and converts the quantized first latent variable into the target pixel kernel that is of each pixel in the key frame and that is configured for representing inter-frame motion. Alternatively, the terminal decodes the compressed pixel kernel, to obtain the word sequence; searches the codebook; and converts, based on the codebook, the word sequence into the target pixel kernel that is of each pixel in the key frame and that is configured for representing inter-frame motion.

In an embodiment, the compression method may be applied to an application stage and a training stage of video compression. When the compression method is applied to the training stage, a distortion loss and a bit rate loss may be used to optimize an intelligent compression model. The distortion loss may measure recovery quality of a decompressed frame, the bit rate loss may measure a quantity of bytes of a compressed file, and a combination of the distortion loss and the bit rate loss may balance a relationship between a bit rate and reconstruction quality. The intelligent compression model may be a network model constructed based on an intelligent compression algorithm.

The residual graph and the target pixel kernel are obtained through compression by using the intelligent (AI) compression algorithm, and the compressed graph and the compressed pixel kernel are obtained through decompression by using the intelligent compression model. The operation of optimizing an intelligent compression model includes: determining, by the terminal, a distortion loss between the predicted frame and the forward search frame, to obtain a first distortion loss; determining a distortion loss between the target predicted frame and the forward search frame, to obtain a second distortion loss; separately determining a bit rate loss of the target pixel kernel and a bit rate loss of the residual graph, to obtain a first bit rate loss and a second bit rate loss; and adjusting a parameter of the intelligent compression model based on the first distortion loss, the second distortion loss, the first bit rate loss, and the second bit rate loss.

The first distortion loss may be a mean square error (MSE) between the predicted frame and the forward search frame, and the second distortion loss may be an MSE between the target predicted frame and the forward search frame. The first bit rate loss may be a ratio of a file data amount to a quantity of pixels after the feature map of the target pixel kernel is compressed, and the second bit rate loss may be a ratio of a file data amount to a quantity of pixels after the residual graph is compressed.

In an embodiment, the terminal may determine a comprehensive loss based on the first distortion loss, the second distortion loss, the first bit rate loss, and the second bit rate loss, and adjust the parameter of the intelligent compression model according to the comprehensive loss. A function expression of the comprehensive loss is as follows:

$$Loss = \lambda_1 d(x, \bar{x}) + \lambda_2 d(x, \hat{x}) + H(\hat{m}) + H(\hat{r})$$

$d(x, \bar{x})$ represents the MSE between the predicted frame and the forward search frame, that is, the first distortion loss; $d(x, \hat{x})$ represents the MSE between the target predicted frame and the forward search frame, that is, the second distortion loss, $H(\hat{m})$ represents the ratio of the file data amount to the quantity of pixels after the feature map of the target pixel kernel is compressed, that is, the first bit rate loss; $H(\hat{r})$ represents the ratio of the file data amount to the quantity of pixels after the residual graph is compressed, that is, the second bit rate loss; and $\lambda_1$ and $\lambda_2$ represent adjustment factors configured for adjusting video compression quality, where values of $\lambda_1$ and $\lambda_2$ may be values greater than 0.

The intelligent compression model may perform compression or may perform smoothness constraint processing. Therefore, in a process of adjusting the parameter of the intelligent compression model, a weight of the target pixel kernel may be adjusted, so that the weight of the target pixel kernel reaches an optimal state. For comparison between impact of different weights on distribution of target pixel kernels, reference may be made to FIG. 8.

In the foregoing embodiments, the pixel kernel of each pixel in the key frame is generated based on the key frame and the forward search frame of the video. Smoothness constraint processing is performed on the pixel kernel, to obtain the target pixel kernel accurately representing inter-frame motion. Because the target pixel kernel is obtained by performing smoothness constraint processing on the pixel kernel, structures of target pixel kernels of adjacent pixels are similar, which facilitate video compression. In addition, during decompression, a pixel in a neighborhood of a corresponding pixel in the key frame can be accurately captured. Therefore, a spatial offset can also be accurately estimated regardless of when motion deformation is relatively complex, thereby facilitating accurate video decompression. In addition, the key frame and the target pixel kernel are compressed, to obtain the compressed key frame and the compressed pixel kernel. The residual graph between the forward search frame and the predicted frame is compressed, and the compressed video packet may be obtained according to the compressed graph corresponding to the residual graph, the compressed key frame, and the compressed pixel kernel. Only the key frame, the target pixel kernel, and the residual graph need to be compressed instead of compressing all frames of the video, thereby greatly reducing a data amount of the video, avoiding additional residual compensation information caused by inaccurate offset estimation, and improving efficiency and accuracy of video decompression.

In an embodiment, as shown in FIG. 9, S202 may specifically include the following operations.

S902: Extract the key frame and the forward search frame from the video.

There may be a plurality of key frames in a video, each key frame may correspond to one or more forward search frames, and a similarity exists between the key frame and a corresponding forward search frame, for example, the similarity is greater than or equal to 70%. For example, for a video, a video frame in which a character a exactly appears in the video is a key frame, and video frames of a hand of the character a moving from bottom to top are forward search frames.

S904: Perform image feature extraction on the key frame and the forward search frame, to obtain a target feature map.

In an embodiment, the terminal may first splice the key frame and the forward search frame, to obtain a spliced video frame; encode the spliced video frame by using an encoder of a feature extraction network, to obtain an encoded feature; and decode the encoded feature by using a decoder of the feature extraction network, to obtain the target feature map.

The feature extraction network may include an encoder part and a decoder part, and an encoder in the encoder part and a decoder in the decoder part are in a skip connection. FIG. 10 is a detailed structural diagram of a feature extraction network. A left side of the figure is an encoder part, a right side is a decoder part, a rectangular box with black spots in the figure corresponds to a multi-channel feature, and a quantity of channels is displayed above the rectangular box. A white rectangular box in the figure is a copied and cropped feature, and arrows pointing to different directions represent different operations.

S906: Respectively convert feature vectors in the target feature map into the pixel kernels of the pixels in the key frame.

In an embodiment, the terminal may perform spatial alignment on the target feature map and the key frame, the target feature map being a three-dimensional feature map, and a width/height value of the target feature map being the same as a width/height value of the key frame, as shown in FIG. 3; and respectively convert the feature vectors in the target feature map corresponding to the pixels in the key frame into the pixel kernels. Because the target feature map is obtained by performing image feature processing on the key frame and the forward search frame, and the width/height value of the target feature map is the same as the width/height value of the key frame, the target feature map has a feature vector in one-to-one correspondence with each pixel in the key frame, and a position of the pixel in the key frame is the same as a plane position of the feature vector in the target feature map.

In the foregoing embodiments, the pixel kernel of each pixel in the key frame is generated based on the key frame and the forward search frame of the video, where the pixel kernel may be configured for modeling inter-frame motion. Compared with the conventional solution in which pixel-level offset prediction is performed by using an optical flow network, in this application, a spatial offset can be accurately estimated, and after smoothness constraint processing is performed, accuracy of spatial offset prediction can be further improved.

In an embodiment, as shown in FIG. 11, a video decompression method is provided. The method may be applied to the terminal 102, the server 104, or the terminal 106 in FIG. 1. An example in which the method is applied to the terminal 106 in FIG. 1 is configured for description, and the method includes the following operations.

S1102: Decompress a compressed key frame and a compressed graph in a video packet, to obtain a key frame and a residual graph.

The compressed key frame is obtained by performing intra-frame encoding on a key frame of a video. The compressed graph is obtained by compressing a residual graph between a forward search frame and a predicted frame, and the residual graph may be a graph obtained according to a difference between the forward search frame and the predicted frame.

The key frame may be a video frame on which intra-frame encoding needs to be performed in the video. For example, a video has a plurality of shots (namely, a clip between every two edit points in the video), and a first frame of each shot may be used as the key frame. For another example, when a difference between two adjacent video frames reaches a preset threshold, the latter video frame may alternatively be used as the key frame. The key frame may be a red green blue (RGB) three-channel image or may be an image of another type.

The forward search frame may be a video frame other than the key frame in the video and may be reconstructed by using the key frame and inter-frame difference information (for example, a residual graph and a target pixel kernel in this application). The forward search frame may be a three-channel image or may be an image of another type.

In an embodiment, intra-frame decoding is performed on the compressed key frame in the video packet, to obtain the key frame. Then, the compressed graph in the video packet is decoded, to obtain a quantized second latent variable. The quantized second latent variable is converted into the residual graph.

The second latent variable may be a variable matching the residual graph in the latent space.

For example, the compressed graph is inputted into a decoder, and the compressed graph is decoded by using the decoder, to obtain the quantized second latent variable. Then, the quantized second latent variable is converted into the quantized residual graph from the latent space. For a decompression process, reference may be made to FIG. 6.

S1104: Decompress a compressed pixel kernel in the video packet, to obtain a target pixel kernel.

The target pixel kernel may be configured for representing inter-frame motion and is obtained by performing smoothness constraint processing on a pixel kernel. The smoothness constraint processing may include intra-kernel smoothness constraint processing and inter-kernel smoothness constraint processing, the intra-kernel smoothness constraint processing indicates smoothness constraint processing inside a pixel kernel, and the inter-kernel smoothness constraint processing indicates smoothness constraint processing between pixel kernels. Accurate inter-frame spatial motion can be learned by using the target pixel kernel obtained through the smoothness constraint processing, and fuzzy information is further learned. In addition, structures of target pixel kernels of adjacent pixels are similar, meet a prior of motion estimation, and facilitate information compression. The fuzzy information may be configured for modeling uncertainty of spatial offset prediction, so that residual compensation is easier, and an additional error caused by incorrect motion estimation does not need to be compensated.

The pixel kernel may be a matrix including inter-frame spatial motion information and is a matrix of each pixel in the key frame generated based on the key frame and the forward search frame of the video. Each pixel in the key frame corresponds to one or more pixel kernels. For example, when a quantity of forward search frames corresponding to a key frame is 1, a quantity of pixel kernels of each pixel in the key frame is 1 or 1*k, k being a positive integer greater than 1. Therefore, one pixel kernel or 1*k pixel kernels acts or act on a corresponding pixel and a neighborhood pixel of the pixel in the key frame, and a corresponding pixel in the forward search frame and a value of the pixel may be predicted. When a quantity of forward search frames corresponding to a key frame is n (n≥2), a quantity of pixel kernel of each pixel in the key frame is n or n*k. Therefore, n or n*k pixel kernels sequentially act on corresponding pixels and neighborhood pixels of the pixels in the key frame, and corresponding pixels in the n forward search frames and values of the pixels may be predicted.

If at least two copied target pixel kernels are compressed to obtain the compressed pixel kernel in the compression process, during decompression, the at least two target pixel kernels cascaded on each pixel in the key frame may be obtained.

When compressing the target pixel kernel, a source end (namely, the terminal 102 in FIG. 1) may directly compress the target pixel kernel or compress the target pixel kernel by using a codebook. Therefore, during decompression, decompression is performed by selecting a matching decompression manner according to an actual situation. Details are provided as follows.

Decompression manner 1: Directly decompress the compressed pixel kernel.

In an embodiment, the terminal decodes the compressed pixel kernel in the video packet, to obtain a quantized first latent variable; and converts the quantized first latent variable into the target pixel kernel that is of each pixel in the key frame and that is configured for representing inter-frame motion.

The first latent variable may be a variable matching the target pixel kernel in latent space.

For example, as shown in FIG. 6, when a compress pixel kernel in a video packet is obtained, the compressed pixel kernel is decoded through arithmetic decoding, to obtain a quantized first latent variable. Then, the quantized first latent variable is converted into a quantized feature map by using a decoder, and each target pixel kernel is decomposed from the feature map.

Decompression manner 2: Decompress the target pixel kernel by using a codebook.

In an embodiment, the terminal decodes the compressed pixel kernel, to obtain a word sequence; searches a codebook; and converts, based on the codebook, the word sequence into the target pixel kernel that is of each pixel in the key frame and that is configured for representing inter-frame motion.

The codebook is predefined in both an encoder and a decoder, and does not need to be transmitted with the video packet. A construction manner of the codebook includes: selecting several representative video frames from a to-be-compressed video, and then constructing the codebook by using the selected video frames. Each word in the codebook corresponds to a target pixel kernel having a specific offset and fuzzy information.

For example, as shown in FIG. 7, during decompression, a feature map is recovered from a word sequence by searching a codebook, and then a target pixel kernel that is of each pixel in a key frame and that is configured for representing inter-frame motion is obtained through decomposition from the feature map.

S1106: Perform inter-frame offset processing on a pixel and a neighborhood pixel of the pixel in the key frame in sequence based on the target pixel kernel, to obtain a predicted frame.

The predicted frame is a video frame matching a real forward search frame. The neighborhood pixel may be a set including pixels whose distances from the pixel are less than a preset distance.

In an embodiment, the terminal may perform inter-frame offset processing on the pixel and the neighborhood pixel of the pixel in the key frame in sequence based on at least two target pixel kernels cascaded on each pixel in the key frame, to obtain the predicted frame.

In an embodiment, the terminal may perform weighted processing on the pixel and the neighborhood pixel of the pixel in the key frame based on a weight value in the target pixel kernel in sequence, to obtain the predicted frame.

S1108: Perform image compensation on the predicted frame based on the residual graph, to obtain a target predicted frame. The key frame and the target predicted frame are video frames in a video.

The target predicted frame is also a reconstructed video frame that matches a real forward search frame. In video content, the target predicted frame is the same as the forward search frame. A difference lies in that the forward search frame is an original video frame in the video, and the target predicted frame is a video frame reconstructed based on the key frame, the target pixel kernel, and the residual graph.

The video may be a video of any type produced by a production object, for example, a short video, a long video, or a live streaming video.

In an embodiment, after the key frame and the target predicted frame are obtained, a video may be synthesized according to the key frame and the target predicted frame, and then played on a playback page. If the video is a video synthesized by using a plurality of interaction videos, in a playing process, when the video is played to a target progress, a transparent or semi-transparent interaction page (for example, an H5 page) may be loaded, and then at least two interaction controls are displayed on the interaction page. In response to a triggering operation on the interaction control, the video is jumped to a progress corresponding to the interaction control selected by the triggering operation to play. When the video is a video synthesized by using the plurality of interaction videos, each interaction video may be compressed when video compression is performed.

For example, when a played video is a video synthesized by using a plurality of interaction videos, when the video is played to a specific playback progress, an interaction control that interact with each interaction video may be displayed, for example, different interaction controls correspond to different interaction videos. When one of the interaction controls is tapped, the interaction video corresponding to the interaction control may be jumped to play. As shown in FIG. 12, when the video is played to a specific playback progress, interaction controls "Change hair style" and "Change voice" are displayed on an interaction page carried by Web View. When the interaction control "Change hair style" is tapped, an interaction video of "Change hair style" is determined, and then the interaction video of "Change hair style" is jumped to play.

In the foregoing embodiments, the compressed key frame and the compressed graph in the video packet are decompressed, to obtain the key frame and the residual graph. The compressed pixel kernel in the video packet is decompressed to obtain the target pixel kernel that is of each pixel in the key frame and that is configured for representing inter-frame motion. The target pixel kernel is obtained by performing smoothness constraint processing on a pixel kernel. Therefore, during decompression, a pixel in a neighborhood of a corresponding pixel in the key frame can be accurately captured, and a spatial offset can be accurately estimated, thereby facilitating accurate video decompression to obtain the predicted frame. In addition, because the spatial offset can be accurately estimated by using the target pixel kernel, only conventional image compensation needs to be performed on the predicted frame based on the residual graph, to obtain the target predicted frame, which can avoid additional residual compensation information caused by inaccurate offset estimation, thereby improving efficiency and accuracy of video decompression.

To better understand the solutions of this application, descriptions are provided herein with reference to an actual application scenario. Details are provided as follows.

This application provides a local weighting module, and a corresponding AI video compression procedure is constructed based on the local weighting module, as shown in FIG. 3.

1. Local Weighting Module (1) Module Introduction

The local weighting module is configured to perform inter-frame motion estimation, and may adaptively generate inter-frame motion and uncertainty information according to two input adjacent video frames. A network structure of the local weighting module is an auto-encoder structure similar to U-Net, and a skip connection is introduced between an encoder part and a decoder part.

As shown in FIG. 3, a spliced image pair including a key frame and a forward predicted frame is used as an input of a local weighting module. The local weighting module may generate a feature map whose size is consistent with a size of the key frame, align the feature map with the key frame in space, and then deform the feature map to obtain a pixel kernel of each pixel in the key frame.

(2) Pixel Kernel Smoothness Constraint

In this application, two smoothness constraint manners are constructed: intra-kernel smoothness constraint and inter-kernel smoothness constraint. The intra-kernel smoothness constraint enables distribution of generated pixel kernels to be continuous and smooth and concentrated in an area, and a correct offset and fuzzy information can be learned, so that during decompression, pixel values are not randomly and discretely captured in a neighborhood of the key frame. The inter-kernel smoothness constraint ensures that structures of adjacent pixel kernels are relatively similar, have an increased number that meet a priori motion estimation, and facilitate information compression.

The pixel kernel smoothness constraint may be implemented by constraining an L2 norm of a gradient (for example, a first-order gradient or a second-order gradient) of a pixel kernel. Specifically, a generated pixel kernel is set to Kernels, and a size of the pixel kernel is (K*K*H*W), where K*K represents a size of the pixel kernel, and H*W represents a spatial size of an image. Therefore, the intra-kernel smoothness constraint and the inter-kernel smoothness constraint may be represented as follows:

$$\mathrm{smooth}_{intra} = \mathrm{mean}(\|\mathrm{Kernels}[1\,:,\ :,\ :,\ :] - \mathrm{Kernels}[:K-1,\ :,\ :,\ :]\|_2 +$$
$$\|\mathrm{Kernels}[:,\ 1\,:,\ :,\ :] - \mathrm{Kernels}[:,\ :K-1,\ :,\ :]\|_2)$$

$$\mathrm{smooth}_{inter} = \mathrm{mean}(\|\mathrm{Kernels}[:,\ :,\ 1\,:,\ :] - \mathrm{Kernels}[:,\ :,\ :H-1,\ :]\|_2 +$$
$$\|\mathrm{Kernels}[:,\ :,\ :,\ 1\,:] - \mathrm{Kernels}[:,\ :,\ :,\ :W-1]\|_2)$$

mean( ) in the expressions represents mean value calculation, and $\| \ \|_2$ represents the L2 norm.

(3) Cascading Policy

During motion estimation based on a pixel kernel, inter-frame offset prediction may be affected by a size of the pixel kernel, and when an inter-frame offset exceeds the size of the pixel kernel, accuracy is reduced when motion prediction is performed by using the pixel kernel. Therefore, an excessively small size of the pixel kernel limits the offset prediction, and an excessively large size of the pixel kernel causes excessive consumption of a video RAM. Target pixel kernels of a same pixel are cascaded. Therefore, inter-frame offset prediction in a larger size is implemented on the premise that only small consumption of the video RAM is increased, thereby effectively improving accuracy of spatial motion prediction.

2. Compression Policy for a Pixel Kernel

A pixel kernel outputted by the local weighting module needs to be compressed by using an intelligent compression algorithm, so as to reduce a bit rate and facilitate storage and transmission. For compression of a pixel kernel, two compression policies are constructed in this application, which are specifically described as follows.

Policy 1: Directly compress a feature map of a pixel kernel.

Referring to FIG. 6, a feature map of a pixel kernel is first mapped to latent space by using an encoder of an auto-encoder, and then a byte stream configured for storage and transmission is obtained through lossy quantization and arithmetic coding. On a decoder side, arithmetic decoding is first performed on the received byte stream, and then an obtained latent variable is decoded into a quantized feature map by using a decoder part of the auto-encoder.

Policy 2: Perform compression by using a codebook.

This application provides a codebook-based compression manner, and a codebook is constructed for a pixel kernel, where each word in the codebook corresponds to a pixel kernel having a specific offset and fuzzy information. Referring to FIG. 7, a pixel kernel is mapped to a word by using a codebook, and the pixel kernel is recovered from the word by searching the codebook during decoding. A feature map of the pixel kernel may be compressed from a data amount H*W*K*K to a data amount H*W*1 by using the word, and then may be further compressed by using a technology such as entropy encoding. The codebook has been predefined at two ends of an encoder and a decoder, and does not need to be transmitted.

3. Residual Compensation and Loss Function

The pixel kernel generated by the local weighting module acts on the key frame, and a predicted frame may be obtained. Because there is a difference between a predicted frame and a real forward search frame, this part of error needs to be compensated. Specifically, the predicted frame is subtracted from the forward search frame to obtain a residual graph. Because the residual graph needs to be stored and transmitted, lossy quantization and entropy encoding need to be performed on the residual graph. For details, reference may be made to FIG. 6. Then, the quantized and decoded residual graph is added to the predicted frame to obtain a reconstructed frame as a final result.

The intelligent compression algorithm provided in this application may be directly configured for performing end-to-end optimization, and a loss function of the intelligent compression algorithm includes two parts: distortion loss and a bit rate loss. The distortion loss may measure recovery quality of a decompressed frame, and the bit rate loss may measure a quantity of bytes of a compressed file. A combination of the distortion loss and the bit rate loss may balance a relationship between a bit rate and reconstruction quality. A formula for calculating the loss function is as follows:

$$Loss = \lambda_1 d(x, \bar{x}) + \lambda_2 d(x, \hat{x}) + H(\hat{m}) + H(\hat{r})$$

where $d(x, \bar{x})$ represents an MSE between the predicted frame and the forward search frame, $d(x, \bar{x})$ represents an MSE between the target predicted frame and the forward search frame, $H(\hat{m})$ and $H(\hat{r})$ respectively represent a bit rate of the pixel kernel and a bit rate of the residual graph compressed file, and $\lambda_1$ and $\lambda_2$ represent adjustment factors configured for adjusting video compression quality. The intelligent compression algorithm is optimized by using a loss calculated by using the loss function, to obtain a finally applied intelligent compression algorithm.

Figures 13, 14:
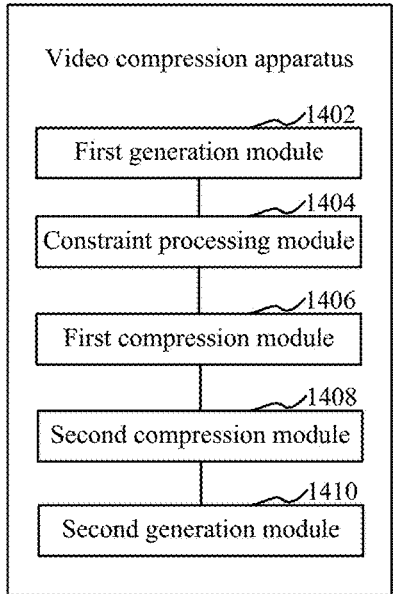
FIG. 13 is a schematic diagram of results of video compression and video decompression according to an embodiment.
FIG. 14 is a structural block diagram of a video compression apparatus according to an embodiment.

This application is not dependent on a hardware environment, and can be flexibly embedded into any video compression framework, and has good scalability. FIG. 13 shows results of video compression and video decompression according to this application. Different rows represent different samples. A moving direction between first sample frames is upper left. Therefore, weights of a pixel kernel corresponding to a foreground position (visualization 1) are distributed in lower right. For a background position (visualization 2), the pixel kernel does not perform offset prediction, and a pixel may be directly captured at a current position (namely, a kernel center). For a second sample, the entire second sample is moved to upper right, and there is a situation in which motion estimation cannot be predicted (for example, presence of a back object). Therefore, for an area (for example, visualization 1) in which motion estimation is relatively determined, an entire pixel kernel may be controlled to lower left to capture a pixel. For an area (for example, visualization 2) in which motion estimation is not determined, blur processing is performed while offset prediction is performed. The pixel kernel on which blur processing is performed can effectively improve accuracy of motion estimation, and when the pixel kernel acts on a key frame to obtain a predicted frame, a problem of additional residual compensation caused by inaccurate estimation can be avoided. The reconstructed frame may be the target predicted frame.

Although the operations in the flowcharts of the embodiments are displayed sequentially according to instructions of arrows, these operations are not necessarily performed sequentially according to a sequence instructed by the arrows. Unless otherwise explicitly specified in this application, execution of the operations is not strictly limited, and the operations may be performed in other sequences. In addition, at least some operations in the flowcharts related to the foregoing embodiments may include a plurality of steps or a plurality of stages. The operations or the stages are not necessarily performed at the same moment, but may be performed at different moments. The operations or the stages are not necessarily performed in sequence, but may be performed in turn or alternately with another operation or at least some of operations or stages of the another operation.

Based on a same invention conception, an embodiment of this application further provides a video compression apparatus configured to implement the video compression method and a video decompression apparatus configured to implement the video decompression method. An implementation solution provided by the apparatus is similar to the implementation solution described in the foregoing method. Therefore, for a specific limitation on the following provided one or more video compression apparatus embodiments, reference may be made to the foregoing limitation on the video compression method. For a specific limitation on video decompression apparatus embodiments, reference may be made to the foregoing limitation on the video decompression method.

In an embodiment, as shown in FIG. 14, a video compression apparatus is provided, including: a first generation module 1402, a constraint processing module 1404, a first compression module 1406, a second compression module 1408, and a second generation module 1410.

The first generation module 1402 is configured to generate, based on a key frame and a forward search frame of a video, a pixel kernel of each pixel in the key frame.

The constraint processing module 1404 is configured to perform smoothness constraint processing on the pixel kernel, to obtain a target pixel kernel configured for representing inter-frame motion.

The first compression module 1406 is configured to compress the key frame and the target pixel kernel, to obtain a compressed key frame and a compressed pixel kernel.

The second compression module 1408 is configured to compress a residual graph between the forward search frame and a predicted frame, to obtain a compressed graph. The predicted frame is a video frame generated based on the target pixel kernel and the key frame.

The second generation module 1410 is configured to obtain a compressed video packet according to the compressed graph, the compressed key frame, and the compressed pixel kernel.

In the foregoing embodiments, the pixel kernel of each pixel in the key frame is generated based on the key frame and the forward search frame of the video. Smoothness constraint processing is performed on the pixel kernel, to obtain the target pixel kernel accurately representing inter-frame motion. Because the target pixel kernel is obtained by performing smoothness constraint processing on the pixel kernel, structures of target pixel kernels of adjacent pixels are similar, which facilitate video compression. In addition, during decompression, a pixel in a neighborhood of a corresponding pixel in the key frame can be accurately captured. Therefore, a spatial offset can also be accurately estimated regardless of when motion deformation is relatively complex, thereby facilitating accurate video decompression. In addition, the key frame and the target pixel kernel are compressed, to obtain the compressed key frame and the compressed pixel kernel. The residual graph between the forward search frame and the predicted frame is compressed, and the compressed video packet may be obtained according to the compressed graph corresponding to the residual graph, the compressed key frame, and the compressed pixel kernel. Only the key frame, the target pixel kernel, and the residual graph need to be compressed instead of compressing all frames of the video, thereby greatly reducing a data amount of the video, avoiding additional residual compensation information caused by inaccurate offset estimation, and improving efficiency and accuracy of video decompression.

In an embodiment, the first generation module 1402 is further configured to extract the key frame and the forward search frame from the video; perform image feature extraction on the key frame and the forward search frame, to obtain a target feature map; and respectively convert feature vectors in the target feature map into the pixel kernels of the pixels in the key frame.

In an embodiment, the first generation module 1402 is further configured to splice the key frame and the forward search frame, to obtain a spliced video frame; encode the spliced video frame by using an encoder of a feature extraction network, to obtain an encoded feature; and decode the encoded feature by using a decoder of the feature extraction network, to obtain the target feature map.

In an embodiment, the first generation module 1402 is further configured to perform spatial alignment on the target feature map and the key frame, the target feature map being a three-dimensional feature map, and a width/height value of the target feature map being the same as a width/height value of the key frame; and respectively convert the feature vectors in the target feature map corresponding to the pixels in the key frame into the pixel kernels.

In the foregoing embodiments, the pixel kernel of each pixel in the key frame is generated based on the key frame and the forward search frame of the video, where the pixel kernel may be configured for modeling inter-frame motion. Compared with the conventional solution in which pixel-level offset prediction is performed by using an optical flow network, in this application, a spatial offset can be accurately estimated, and after smoothness constraint processing is performed, accuracy of spatial offset prediction can be further improved.

In an embodiment, the constraint processing module 1404 is further configured to perform intra-kernel smoothness constraint processing on the pixel kernel of each pixel, to obtain a processed pixel kernel of each pixel; and perform inter-kernel smoothness constraint processing on the processed pixel kernel of each pixel, to obtain the target pixel kernel configured for representing inter-frame motion.

Figure 15:
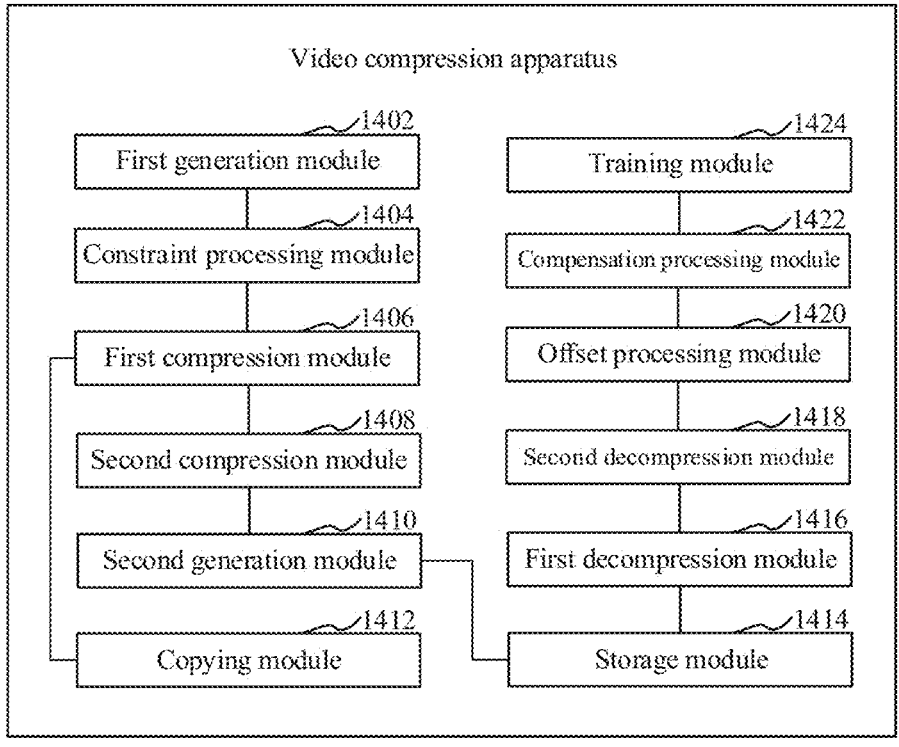
FIG. 15 is a structural block diagram of a video compression apparatus according to another embodiment.

In an embodiment, as shown in FIG. 15, the apparatus further includes:

a copying module 1412, configured to copy the target pixel kernel of each pixel in the key frame, so that each pixel corresponds to at least two target pixel kernels.

In an embodiment, the first compression module 1406 is further configured to perform intra-frame compression on the key frame, to obtain the compressed key frame; convert the target pixel kernel into a first latent variable; quantize the first latent variable, to obtain a quantized first latent variable; and encode the quantized first latent variable, to obtain the compressed pixel kernel.

In an embodiment, the first compression module 1406 is further configured to perform intra-frame compression on the key frame, to obtain the compressed key frame; obtain a codebook; and map the target pixel kernel to a word sequence based on the codebook, and encode the word sequence, to obtain the compressed pixel kernel.

In an embodiment, the second compression module 1408 is further configured to determine the residual graph between the predicted frame and the forward search frame; convert the residual graph into a second latent variable; quantize the second latent variable, to obtain a quantized second latent variable; and encode the quantized second latent variable, to obtain the compressed graph.

In an embodiment, as shown in FIG. 15, the apparatus further includes:

a storage module 1414, configured to store the video packet;

a first decompression module 1416, configured to: when the video packet needs to be decompressed, decompress the compressed key frame and the compressed graph in the video packet, to obtain the key frame and the residual graph;

a second decompression module 1418, configured to decompress the compressed pixel kernel in the video packet, to obtain the target pixel kernel;

an offset processing module 1420, configured to perform inter-frame offset processing on a pixel and a neighborhood pixel of the pixel in the key frame in sequence based on the target pixel kernel, to obtain a predicted frame; and a compensation module 1422, configured to perform image compensation on the predicted frame based on the residual graph, to obtain a target predicted frame, the target predicted frame being a reconstructed video frame of the forward search frame.

In an embodiment, the residual graph and the target pixel kernel are obtained through compression by using an intelligent compression algorithm, and the compressed graph and the compressed pixel kernel are obtained through decompression by using the intelligent compression algorithm. As shown in FIG. 15, the apparatus further includes:

a training module 1424, configured to determine a distortion loss between the predicted frame and the forward search frame, to obtain a first distortion loss; determine a distortion loss between the target predicted frame and the forward search frame, to obtain a second distortion loss; separately determine a bit rate loss of the target pixel kernel and a bit rate loss of the residual graph, to obtain a first bit rate loss and a second bit rate loss; and adjust a parameter of the intelligent compression model based on the first distortion loss, the second distortion loss, the first bit rate loss, and the second bit rate loss.

Figure 16:
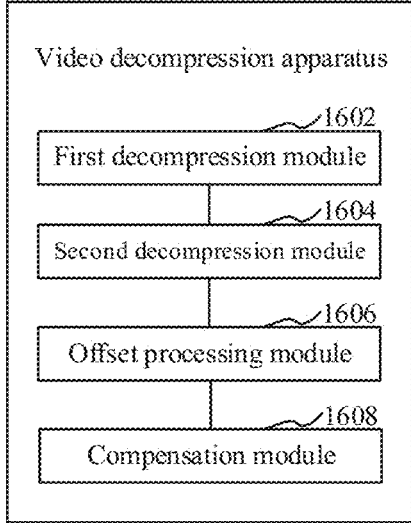
FIG. 16 is a structural block diagram of a video decompression apparatus according to an embodiment.

In an embodiment, as shown in FIG. 16, a video decompression apparatus is provided, including: a first decompression module 1602, a second decompression module 1604, an offset processing module 1606, and a compensation module 1608.

The first decompression module 1602 is configured to decompress a compressed key frame and a compressed graph in a video packet, to obtain a key frame and a residual graph.

The second decompression module 1604 is configured to decompress a compressed pixel kernel in the video packet, to obtain a target pixel kernel that is of each pixel in the key frame and that is configured for representing inter-frame motion.

The offset processing module 1606 is configured to perform inter-frame offset processing on a pixel and a neighborhood pixel of the pixel in the key frame in sequence based on the target pixel kernel, to obtain a predicted frame.

The compensation module 1608 is configured to perform image compensation on the predicted frame based on the residual graph, to obtain a target predicted frame, the key frame and the target predicted frame being video frames in a video.

In an embodiment, the second decompression module 1604 is further configured to decode the compressed pixel kernel in the video packet, to obtain a quantized first latent variable; and convert the quantized first latent variable into the target pixel kernel that is of each pixel in the key frame and that is configured for representing inter-frame motion.

In an embodiment, the second decompression module 1604 is further configured to decode the compressed pixel kernel, to obtain a word sequence; search a codebook; and convert the word sequence into the target pixel kernel of each pixel in the key frame based on the codebook.

In an embodiment, the first decompression module 1602 is further configured to perform intra-frame decoding on the compressed key frame in the video packet, to obtain the key frame; decode the compressed graph in the video packet, to obtain a quantized second latent variable; and convert the quantized second latent variable into the residual graph.

In the foregoing embodiments, the compressed key frame and the compressed graph in the video packet are decompressed, to obtain the key frame and the residual graph. The compressed pixel kernel in the video packet is decompressed, to obtain the target pixel kernel that is of each pixel in the key frame and that is configured for representing inter-frame motion, and the target pixel kernel is obtained by performing smoothness constraint processing on a pixel kernel, so that during decompression, a pixel in a neighborhood of a corresponding pixel in the key frame can be accurately captured. Therefore, a spatial offset can also be accurately estimated regardless of when motion deformation is relatively complex, thereby facilitating accurate video decompression to obtain the predicted frame. In addition, because the spatial offset can be accurately estimated by using the target pixel kernel, only conventional image compensation needs to be performed on the predicted frame based on the residual graph, to obtain the target predicted frame, which can avoid additional residual compensation information caused by inaccurate offset estimation, thereby improving efficiency and accuracy of video decompression.

Each module in the video compression apparatus and the video decompression apparatus may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 17:
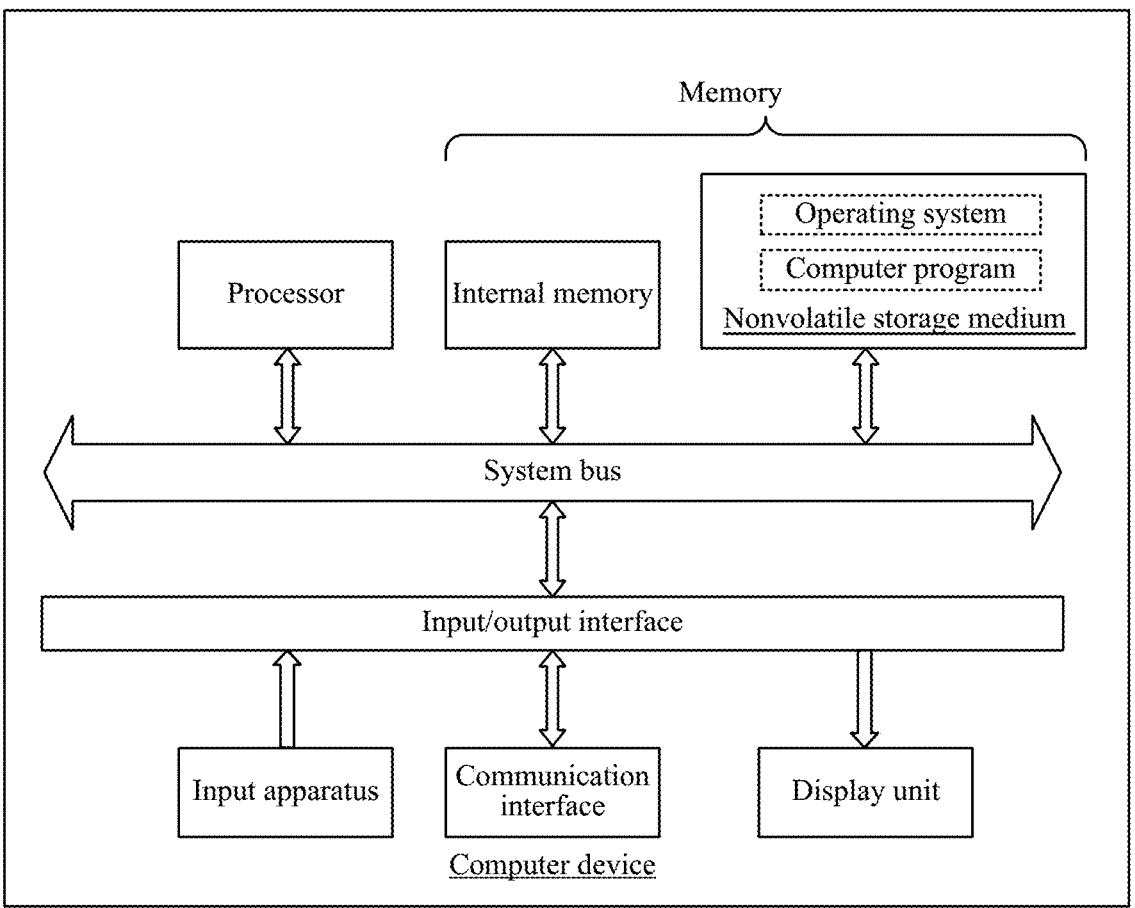
FIG. 17 is a diagram of an internal structure of a computer device according to an embodiment.

In an embodiment, a computer device is provided. The computer device may be a server or a terminal. An example in which the computer device is the terminal is used, and an internal structure diagram thereof may be shown in FIG. 17. The computer device includes a processor, a memory, an input/output interface, a communication interface, a display unit, and an input apparatus. The processor, the memory, and the input/output interface are connected through a system bus, and the communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and a computer program. The internal memory provides an environment for running the operating system and the computer program in the non-volatile storage medium. The input/output interface of the computer device is configured to exchange information between the processor and an external device. The communication interface of the computer device is configured to communicate with an external terminal in a wired or wireless manner. The wireless manner may be implemented by using Wi-Fi, a mobile cellular network, a near field communication (NFC), or another technology. The computer program is executed by the processor to implement the video compression method and the video decompression method. The display unit of the computer device is configured to form a visual picture and may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that in the structure shown in FIG. 16 is merely a block diagram of a partial structure related to a solution in this application, and does not constitute a limitation to the computer device to which the solution in this application is applied. Specifically, the computer device may include more or fewer components than those shown in the figure, or some components may be combined, or a different component deployment may be used.

In an embodiment, a computer device is provided, including a memory and a processor. The memory stores a computer program, and when executing the computer program, the processor implements the operations of the video compression method and implements the operations of the video decompression method.

In an embodiment, a computer-readable storage medium is provided, having a computer program stored therein. The computer program, when executed by a processor, implements the operations of the video compression method and implements the operations of the video decompression method.

In an embodiment, a computer program product is provided, including a computer program. The computer program, when executed by a processor, implements the operations of the video compression method and perform the operations of the video decompression method.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include at least one of a non-volatile memory and a volatile memory. The nonvolatile memory may include a read-only memory (ROM), a magnetic tape, a floppy disk, a flash memory, an optical memory, a high density embedded nonvolatile memory, a resistive random access memory (ReRAM), a magnetoresistive random access memory (MRAM), a ferroelectric random access memory (FRAM), a phase change memory (PCM), a graphene memory, and the like The volatile memory may include a random access memory (RAM) or an external cache. For the purpose of description instead of limitation, the RAM is available in a plurality of forms, such as a static RAM (SRAM) or a dynamic RAM (DRAM). The databases involved in the embodiments provided in this application may include at least one of a relational database or a non-relational database. The non-relational database may include a blockchain-based distributed database or the like, which is not limited thereto. The processor involved in the embodiments provided in this application may be a general purpose processor, a central processing unit, a graphics processor, a digital signal processor, a programmable logic device, a quantum computing-based data processing logic device, or the like, which is not limited thereto.

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments show only several implementations of this application and are described in detail, which, however, are not to be construed as a limitation to the patent scope of this application. For a person of ordinary skill in the art, several transformations and improvements can be made without departing from the idea of this application. These transformations and improvements belong to the protection scope of this application. Therefore, the protection scope of this application shall be subject to the appended claims.

What is claimed is:

1. A video compression method, performed by a computer device, the method comprising:
    generating, based on a key frame and a forward search frame of a video, a pixel kernel of each pixel in the key frame;
    performing smoothness constraint processing on the pixel kernel, to obtain a target pixel kernel;
    compressing the key frame and the target pixel kernel, to obtain a compressed key frame and a compressed pixel kernel;
    compressing a residual graph between the forward search frame and a predicted frame, to obtain a compressed graph, the predicted frame being a video frame generated based on the target pixel kernel and the key frame; and
    obtaining a compressed video packet according to the compressed graph, the compressed key frame, and the compressed pixel kernel.

2. The method according to claim 1, wherein the generating, based on a key frame and a forward search frame of a video, a pixel kernel of each pixel in the key frame comprises:
    extracting the key frame and the forward search frame from the video;
    performing image feature extraction on the key frame and the forward search frame, to obtain a target feature map; and
    respectively converting feature vectors in the target feature map into the pixel kernels of the pixels in the key frame.

3. The method according to claim 2, wherein the performing image feature extraction on the key frame and the forward search frame, to obtain a target feature map comprises:
    splicing the key frame and the forward search frame, to obtain a spliced video frame;

encoding the spliced video frame by using an encoder of a feature extraction network, to obtain an encoded feature; and
    decoding the encoded feature by using a decoder of the feature extraction network, to obtain the target feature map.

4. The method according to claim 2, wherein the respectively converting feature vectors in the target feature map into the pixel kernels of the pixels in the key frame comprises:
    performing spatial alignment on the target feature map and the key frame, the target feature map being a three-dimensional feature map, and a width/height value of the target feature map being the same as a width/height value of the key frame; and
    respectively converting the feature vectors in the target feature map corresponding to the pixels in the key frame into the pixel kernels.

5. The method according to claim 1, wherein the performing smoothness constraint processing on the pixel kernel, to obtain a target pixel kernel comprises:
    performing intra-kernel smoothness constraint processing on the pixel kernel of each pixel, to obtain a processed pixel kernel of each pixel; and
    performing inter-kernel smoothness constraint processing on the processed pixel kernel of each pixel, to obtain the target pixel kernel.

6. The method according to claim 1, wherein before the compressing the key frame and the target pixel kernel, to obtain a compressed key frame and a compressed pixel kernel, the method further comprises:
    copying the target pixel kernel of each pixel in the key frame, so that each pixel corresponds to at least two target pixel kernels.

7. The method according to claim 1, wherein the compressing the key frame and the target pixel kernel, to obtain a compressed key frame and a compressed pixel kernel comprises:
    performing intra-frame compression on the key frame, to obtain the compressed key frame;
    converting the target pixel kernel into a first latent variable;
    quantizing the first latent variable, to obtain a quantized first latent variable; and
    encoding the quantized first latent variable, to obtain the compressed pixel kernel.

8. The method according to claim 1, wherein the compressing the key frame and the target pixel kernel, to obtain a compressed key frame and a compressed pixel kernel comprises:
    performing intra-frame compression on the key frame, to obtain the compressed key frame;
    obtaining a codebook; and
    mapping the target pixel kernel to a word sequence based on the codebook, and encoding the word sequence, to obtain the compressed pixel kernel.

9. The method according to claim 1, wherein the compressing a residual graph between the forward search frame and a predicted frame, to obtain a compressed graph comprises:
    determining the residual graph between the predicted frame and the forward search frame;
    converting the residual graph into a second latent variable;
    quantizing the second latent variable, to obtain a quantized second latent variable; and
    encoding the quantized second latent variable, to obtain the compressed graph.

10. The method according claim 1, further comprising:

in response to determining to decompress the video packet, decompressing the compressed key frame and the compressed graph in the video packet, to obtain the key frame and the residual graph;

decompressing the compressed pixel kernel in the video packet, to obtain the target pixel kernel;

performing inter-frame offset processing on a pixel and a neighborhood pixel of the pixel in the key frame in sequence based on the target pixel kernel, to obtain a predicted frame; and performing image compensation on the predicted frame based on the residual graph, to obtain a target predicted frame, the target predicted frame being a reconstructed video frame of the forward search frame.

11. The method according to claim 10, wherein the residual graph and the target pixel kernel are obtained through compression by using an intelligent compression model, and the compressed graph and the compressed pixel kernel are obtained through decompression by using the intelligent compression model; and the method further comprises:

determining a distortion loss between the predicted frame and the forward search frame, to obtain a first distortion loss;

determining a distortion loss between the target predicted frame and the forward search frame, to obtain a second distortion loss;

separately determining a bit rate loss of the target pixel kernel and a bit rate loss of the residual graph, to obtain a first bit rate loss and a second bit rate loss; and adjusting a parameter of the intelligent compression model based on the first distortion loss, the second distortion loss, the first bit rate loss, and the second bit rate loss.

12. A video decompression method, performed by a computer device, the method comprising:

decompressing a compressed key frame and a compressed graph in a video packet, to obtain a key frame and a residual graph;

decompressing a compressed pixel kernel in the video packet, to obtain a target pixel kernel of each pixel in the key frame;

performing inter-frame offset processing on a pixel and a neighborhood pixel of the pixel in the key frame in sequence based on the target pixel kernel, to obtain a predicted frame; and performing image compensation on the predicted frame based on the residual graph, to obtain a target predicted frame, the key frame and the target predicted frame being video frames in a video.

13. The method according to claim 12, wherein the decompressing a compressed pixel kernel in the video packet, to obtain a target pixel kernel of each pixel in the key frame comprises:

decompressing the compressed pixel kernel in the video packet, to obtain a quantized first latent variable; and converting the quantized first latent variable into the target pixel kernel of each pixel in the key frame.

14. The method according to claim 12, wherein the decompressing a compressed pixel kernel in the video packet, to obtain a target pixel kernel of each pixel in the key frame comprises:

decoding the compressed pixel kernel, to obtain a word sequence;

searching a codebook; and converting the word sequence into the target pixel kernel of each pixel in the key frame based on the codebook.

15. The method according to claim 12, wherein the decompressing a compressed key frame and a compressed graph in a video packet, to obtain a key frame and a residual graph comprises:

performing intra-frame decoding on the compressed key frame in the video packet, to obtain the key frame;

decoding the compressed graph in the video packet, to obtain a quantized second latent variable; and converting the quantized second latent variable into the residual graph.

16. A video compression apparatus comprising:

a memory storing a plurality of instructions; and a processor configured to execute the plurality of instructions, wherein upon execution of the plurality of instructions, the processor is configured to:

generate, based on a key frame and a forward search frame of a video, a pixel kernel of each pixel in the key frame;

perform smoothness constraint processing on the pixel kernel, to obtain a target pixel kernel;

compress the key frame and the target pixel kernel, to obtain a compressed key frame and a compressed pixel kernel;

compress a residual graph between the forward search frame and a predicted frame, to obtain a compressed graph, the predicted frame being a video frame generated based on the target pixel kernel and the key frame; and obtain a compressed video packet according to the compressed graph, the compressed key frame, and the compressed pixel kernel.

17. The video compression apparatus according to claim 16, wherein in order to generate, based on the key frame and the forward search frame of the video, the pixel kernel of each pixel in the key frame, the processor, upon execution of the plurality of instructions, is configured to:

extract the key frame and the forward search frame from the video;

perform image feature extraction on the key frame and the forward search frame, to obtain a target feature map; and respectively convert feature vectors in the target feature map into the pixel kernels of the pixels in the key frame.

18. The video compression apparatus according to claim 16, wherein in order to perform smoothness constraint processing on the pixel kernel, to obtain a target pixel kernel, the processor, upon execution of the plurality of instructions, is configured to:

perform intra-kernel smoothness constraint processing on the pixel kernel of each pixel, to obtain a processed pixel kernel of each pixel; and perform inter-kernel smoothness constraint processing on the processed pixel kernel of each pixel, to obtain the target pixel kernel.

19. The video compression apparatus according to claim 16, wherein before the compression of the key frame and the target pixel kernel, to obtain a compressed key frame and a compressed pixel kernel, the processor, upon execution of the plurality of instructions, is further configured to:

copy the target pixel kernel of each pixel in the key frame, so that each pixel corresponds to at least two target pixel kernels.

20. The video compression apparatus according to claim 16, wherein in order to compress the key frame and the target pixel kernel, to obtain the compressed key frame and the compressed pixel kernel, the processor, upon execution of the plurality of instructions, is configured to:

perform intra-frame compression on the key frame, to obtain the compressed key frame;

convert the target pixel kernel into a first latent variable;

quantize the first latent variable, to obtain a quantized first latent variable; and encode the quantized first latent variable, to obtain the compressed pixel kernel.

\*    \*    \*    \*    \*